(No Model.) 2 Sheets—Sheet 1.

L. H. NASH.
JOURNAL BEARING FOR CRANK CONNECTING RODS.

No. 334,034. Patented Jan. 12, 1886.

Witnesses:
R. E. Grant
Fred R. Metzger

Inventor:
Lewis Hallock Nash
by Johnson and Johnson
Attys.

(No Model.) 2 Sheets—Sheet 2.

L. H. NASH.
JOURNAL BEARING FOR CRANK CONNECTING RODS.

No. 334,034. Patented Jan. 12, 1886.

Witnesses:
R. E. Grant
Fred P. Mehpfor

Inventor:—
Lewis Hallock Nash
by Johnson and Johnson
Attys.

UNITED STATES PATENT OFFICE.

LEWIS HALLOCK NASH, OF BROOKLYN, ASSIGNOR TO THE NATIONAL METER COMPANY, OF NEW YORK, N. Y.

JOURNAL-BEARING FOR CRANK-CONNECTING RODS.

SPECIFICATION forming part of Letters Patent No. 334,034, dated January 12, 1886.

Application filed June 3, 1885. Serial No. 167,477. (No model.)

*To all whom it may concern:*

Be it known that I, LEWIS HALLOCK NASH, a citizen of the United States, residing at Brooklyn, in the county of Kings and State of New York, have invented new and useful Improvements in Journal-Bearings for Crank-Connecting Rods, &c., of which the following is a specification.

My invention relates to journal-bearings generally, and particularly in their application to connecting-rods for crank-shafts, pistons, and the like; and the object of my improvement is to render the bearings self-adjusting to give an even bearing upon the journals or connecting-pins, even if they should not be in true line, whereby each section of the box or bearing will receive an equal pressure, and the wear over the whole surface of box and pin will be uniform.

In the usual construction of connecting-rods the bearing-pins are liable to become out of line, and the bearing-box cannot accommodate itself to the deflected position of the pin, and therefore the total pressure will come upon one edge of the bearing-box, and the latter will wear away until the bearing has been worn to fit the pin according to the degree of its deflection, and the efficiency of the bearing is thereby impaired.

In the application of my improvement to crank-connecting rods the bearings are formed within the latter, so that they will conform to the position of the bearing-pins, and the bearing will be uniform alike upon the box and upon the pin under all conditions.

The drawings represent a connecting-rod such as is used for a crank-connection having a construction suited for self-adjusting bearings; but my improvement in the bearing-box may be applied to journals for shafting and for connecting-rods generally.

Figure 1:
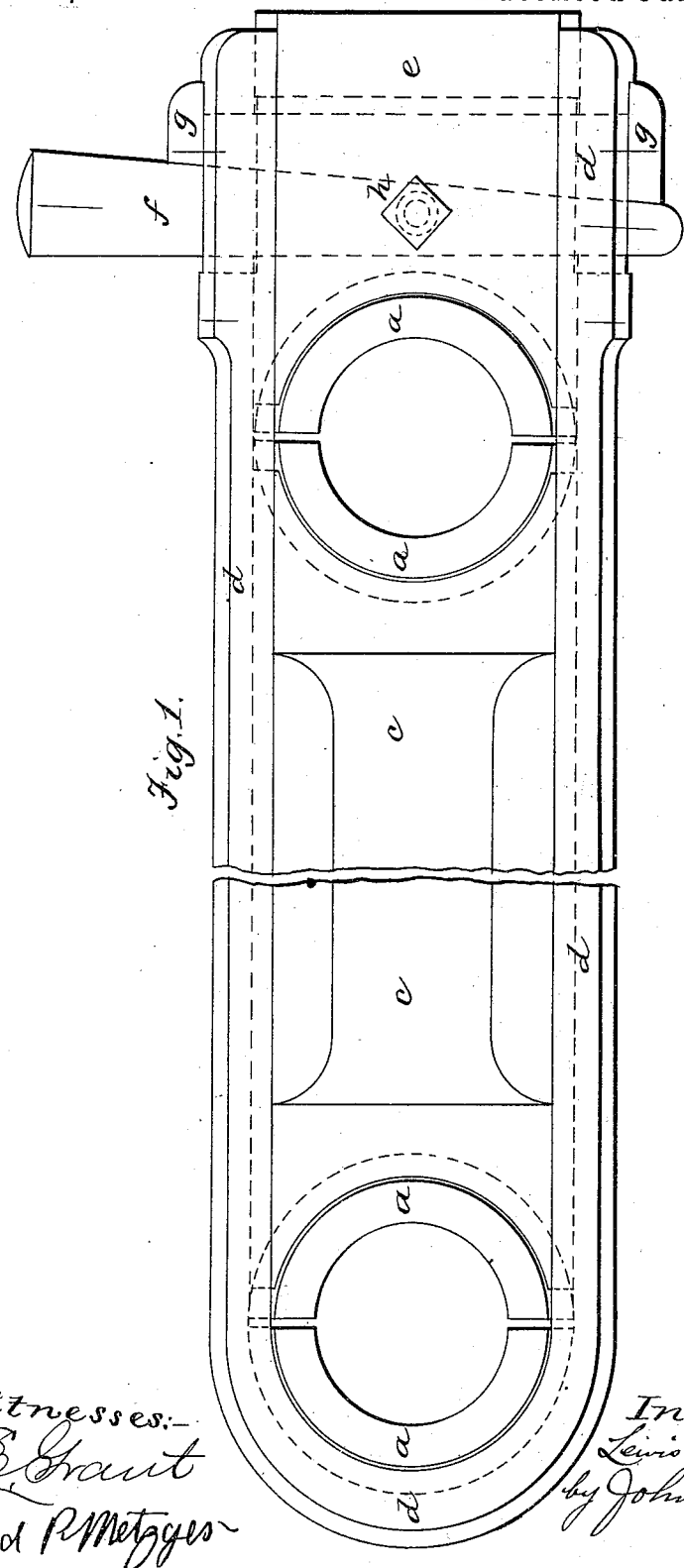
Figure 2:
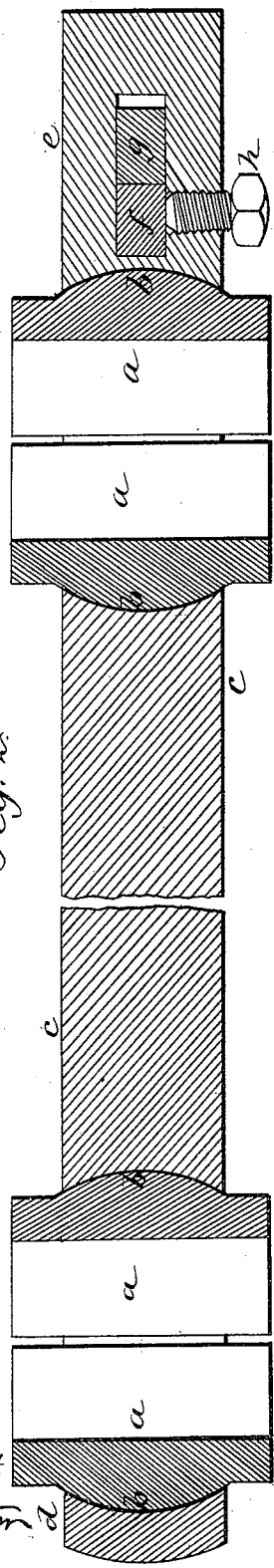
Figure 3:
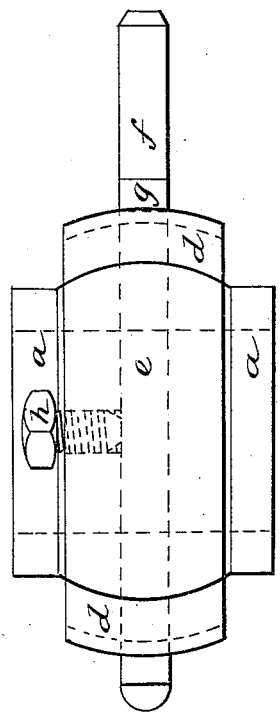

Figure 1 represents a side view of a connecting-rod containing self-adjusting bearing-boxes; Fig. 2, a longitudinal section of the same through the axes of the bearings, and Fig. 3 an end view of the rod.

The bearing-boxes *a* have an outside curved surface formation, *b*, in form the section of a sphere, and the outer bearing for the box, like the inner bearing for the pin, describes concentric circles, the box being in sections of semi-rings, while the convex formation describes an arc of a circle struck at right angles to the concentric circles, so as to permit the box to have a rolling movement upon its bearings, such as a section of a sphere would have if confined within corresponding bearings. Each end of the rod *c* is curved transversely to fit the spherical formation of the box, and each end of said rod is also curved to form a concave seat for the convex formation corresponding to the convex part of the semi-ring section of the box. At one end of the rod the box is confined upon its seat by a strap, *d*, having an inner concave surface conformation corresponding to the spherical formation of the box and seated thereon. At the other end of the rod the box is confined by an abutting block, *e*, having a conformation to fit upon the box the same as the strap, and the latter, extending the length of the rod, incloses the end box, the edges of the rod, and the edges of the abutting block, to which the straps are keyed. As the strap incloses both boxes, one key, *f*, and gib *g* are sufficient to secure the parts and to take up the lost motion produced by wear in both boxes, since the key *f* forces the abutting block *e* against its box and draws the strap against the other end box, which is encircled and bound by the strap. The edges of the rod and the edges of the abutting block correspond to the inner side curved formation of the strap, so that the latter is held in true relation to its bearing upon the box-sections. A binding-screw, *h*, is to be placed in the side of the abutting block *e*, and is bound upon the key when the boxes are properly set upon the pins, and thus prevents the key from becoming loose.

By the provision of the bearing-seats for the boxes, formed as described, the boxes can move for a small distance about their centers within the body of the rod and upon the encircling end of the strap, and by this movement the boxes will be free to take any position that the pin upon which it bears may assume or stand within the limits of motion allowed to the boxes. As it is only designed to provide for minute variations of the positions of the bearing-pins, the construction shown is perfectly adapted for the purpose; and since the pressure of the strap and of the block-piece upon the boxes is always in a direction toward the center of the arc which describes the bearing-surfaces of said boxes, it is therefore certain that the pressure of the bearing-surfaces upon the pins will be disposed equally on each side of the center of the bearing, and therefore each portion or side of the pin will be subjected to an equal pressure and wear.

I claim—

1. A pitman or connecting-rod having self-adjusting bearing-boxes seated upon the opposite ends of the rod, in combination with a separate strap forming a bearing for one of said end boxes and confining said rod and separate end boxes upon their seats, substantially as described, for the purpose specified.

2. The combination, with a journal-bearing box composed of two semi-ring sections having a circumferential bearing of the form of a section of a sphere, of a rod having bearing-seats corresponding to the arc-bearing of the box, a confining and inclosing strap extending the length of the rod, and a fastening-key and gib, substantially as described, for the purpose specified.

3. A connecting-rod having its ends formed concave transversely, in combination with a divided ring-bearing box seated therein, the abutting block, the inclosing and confining strap, and means for securing it to said abutting-block, the latter and the boxes having a conformation corresponding to the crosswise form of the end of the rod and the inner wall of the strap and outer edges of the rod, and of the abutting block having a form corresponding to the arc-bearing of the box, substantially as described.

4. A self-adjusting journal-bearing box composed of two semi-ring sections, in combination with a connecting-rod and means, substantially such as described, whereby the said bearing-ring sections are secured upon the ends of the rod, substantially as hereinbefore set forth.

In testimony whereof I have hereunto set my hand in the presence of two subscribing witnesses.

LEWIS HALLOCK NASH.

Witnesses:
 H. W. BRINCKERHOFF,
 WILLIAM C. WESTERVELT.